United States Patent [19]

Dellby et al.

[11] Patent Number: 5,509,248
[45] Date of Patent: Apr. 23, 1996

[54] METHOD FOR FILLING AND PACKING INSULATING POWDER IN THE WALLS OF A CABINET BODY

[75] Inventors: Fredrik Dellby, Enskede; Thomas Ohlsson, Sundbyberg, both of Sweden

[73] Assignee: Aktiebolaget Electrolux, Stockholm, Sweden

[21] Appl. No.: 311,917

[22] Filed: Sep. 26, 1994

[30] Foreign Application Priority Data

Sep. 29, 1993 [SE] Sweden .................................. 9303180

[51] Int. Cl.⁶ .................................................. B65G 53/28
[52] U.S. Cl. ..................... 52/742.11; 52/404.1; 52/742.1; 52/742.13; 52/794.1; 220/422; 220/DIG. 9
[58] Field of Search ............................ 52/404.1, 406.1, 52/742.1, 742.11, 742.13, 794.1, 795.1; 220/422, DIG. 9

[56] References Cited

U.S. PATENT DOCUMENTS

| | | |
|---|---|---|
| 2,128,336 | 3/1938 | Torstensson . |
| 2,164,143 | 11/1939 | Munters . |
| 2,318,744 | 5/1943 | Brown . |
| 2,349,604 | 4/1944 | Heritage ..................................... 52/743 |
| 2,356,827 | 8/1944 | Coss et al. ................................. 52/743 |
| 2,439,602 | 3/1948 | Heritage . |
| 2,439,603 | 4/1948 | Heritage . |
| 2,559,356 | 7/1951 | Hedges ....................................... 52/743 |
| 3,258,883 | 7/1966 | Campanaro et al. ............... 52/406.1 X |
| 3,358,059 | 12/1967 | Snyder .................................... 52/743 X |
| 4,272,935 | 6/1981 | Lukas et al. .......................... 52/743 X |
| 4,644,014 | 2/1987 | Thomson et al. ..................... 52/743 X |

Primary Examiner—Carl D. Friedman
Assistant Examiner—Kevin D. Wilkens
Attorney, Agent, or Firm—Pearne, Gordon, McCoy & Granger

[57] ABSTRACT

A boxlike body (10) with a rear wall (12) and four side walls (14) is brought into a fixture (34) with the free edges (22) of the side walls pointing downwards. The walls of the body are filled with insulating powder by blowing the powder into the rear wall (12) by gaseous medium of a first pressure. The powder is then packed by gaseous medium of a second pressure, which is higher than the first pressure, being let into the rear wall. During the filling and packing the media is let out via a filter element (24) arranged at the free edges (22) of the side walls. After the filling and packing the media is evacuated from the walls through the filter element (24). The body can then be used as a so-called vacuum insulation in a refrigerator or freezer.

6 Claims, 3 Drawing Sheets

METHOD FOR FILLING AND PACKING INSULATING POWDER IN THE WALLS OF A CABINET BODY

BACKGROUND OF THE INVENTION

The invention relates to a method for filling and packing insulating powder in hollow walls of a boxlike body and then evacuating gaseous medium from the walls, so that the powder forms a vacuum insulation in the walls. The body has a rear wall and four side walls, is brought into a fixture with the free edges of the side walls pointing downwards. The fixture supports the inner and outer sides of the walls.

Such a method is known through U.S. Pat. No. 2,164,143. The powder is probably thought to be packed manually, where one plate 4a of the rear wall is removed, and by some tool the powder in the side walls is packed. After packing the powder in the side walls, the plate 4a is mounted and the rear wall is packed with powder through an opening 24. This method has the drawbacks that the person who is packing is exposed to health risks from powder flying around, and that the packing goes slowly, can easily become irregular and is not suited for automatized production.

SUMMARY OF THE INVENTION

The object of the invention is to improve the known method so that the packing can take place without health risks, goes faster, becomes more regular and can be automatized for mass production.

This object is obtained through the method according to the invention wherein the powder is filled by being blown into the rear wall by gaseous medium of a first pressure, that the powder then is packed by gaseous medium of a second pressure, which is higher than the first pressure, being let into the rear wall. The medium during the filling and packing is let out via a filter element arranged at the free edges, after which the medium is evacuated from the walls through the filter element.

It shall be pointed out, that it is known per se, through U.S. Pat. No. 2,439,603, to fill and pack insulating particles in the walls of a refrigerator cabinet by blowing the particles into a rear wall by a gaseous medium and to let the medium out via filter elements arranged around the free edges of four side walls. The insulation thus brought about is not intended to be evacuated, and for that reason, it is not a question of packing the particles so tightly, that a fixture is required for holding the walls during the packing and that an acceptably small sinking in of the walls is obtained at the evacuation.

BRIEF DESCRIPTION OF THE DRAWINGS

An embodiment of an arrangement according to the invention is described below in connexion with the enclosed drawings, in which.

DETAILED DESCRIPTION OF THE PREFERRED EMBODIMENT

Figure 1:
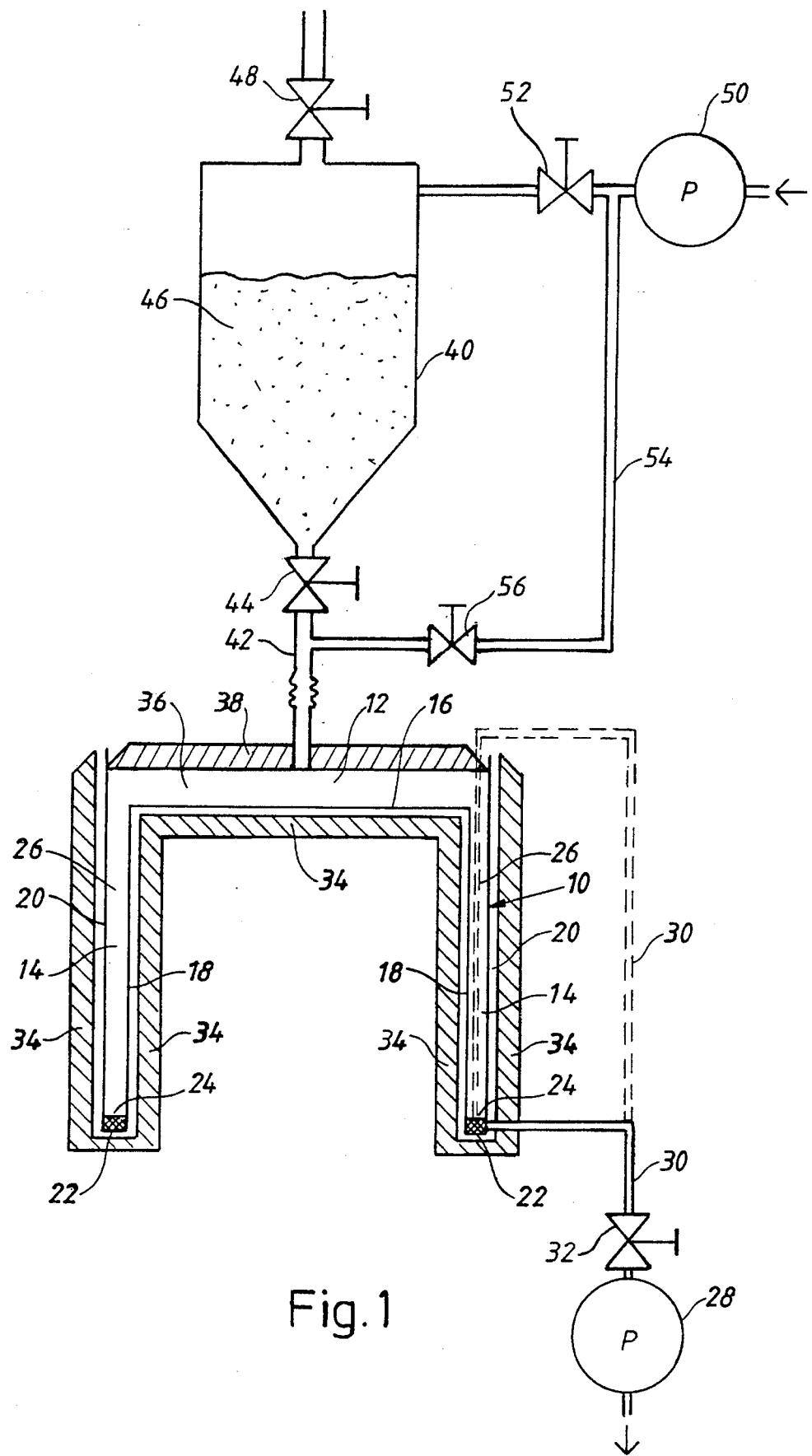
FIG. 1 shows a sectional view of a container with an insulating powder connected to a cabinet body arranged in a fixture.

Referring to FIG. 1 numeral 10 designates a boxlike body, which as an example is intended to form the cabinet of a refrigerator and which shows a rear wall 12 and four side walls 14. The rear wall has an inner plate 16. The side walls have inner and outer plates 18 and 20, respectively. The plates 18 and 20 are united by a plate element 22, which runs around the free edges of the side walls together with a filter element 24 arranged inside the plate element 22. Spaces 26 inside the plates 18 and 20 and a space 36 above the plate 16 communicate with a vacuum pump 28 via the filter element 24, a pipe 30 and a valve 32. The pipe 30 can run from the filter element 24 directly through the plate 20 or upwards through the space 26 to the pump 28.

The body is brought into a fixture 34 with the free ends of the side walls pointing downwards, which fixture supports against the plates 16, 18 and 20. The space 36 is confined by a piston 38 with an opening, through which the space 36 communicates with a container 40 via a pipe 42 and a valve 44. Insulating powder 46, e.g. pearlite or kieselguhr, is supplied to the container 40 via a valve 48. A pump 50 is arranged to supply a gaseous medium, e.g. dried air, to the container 40 via a valve 52. The pump 50 also communicates directly with the pipe 42 via a pipe 54 and a valve 56.

Figures 2, 3:
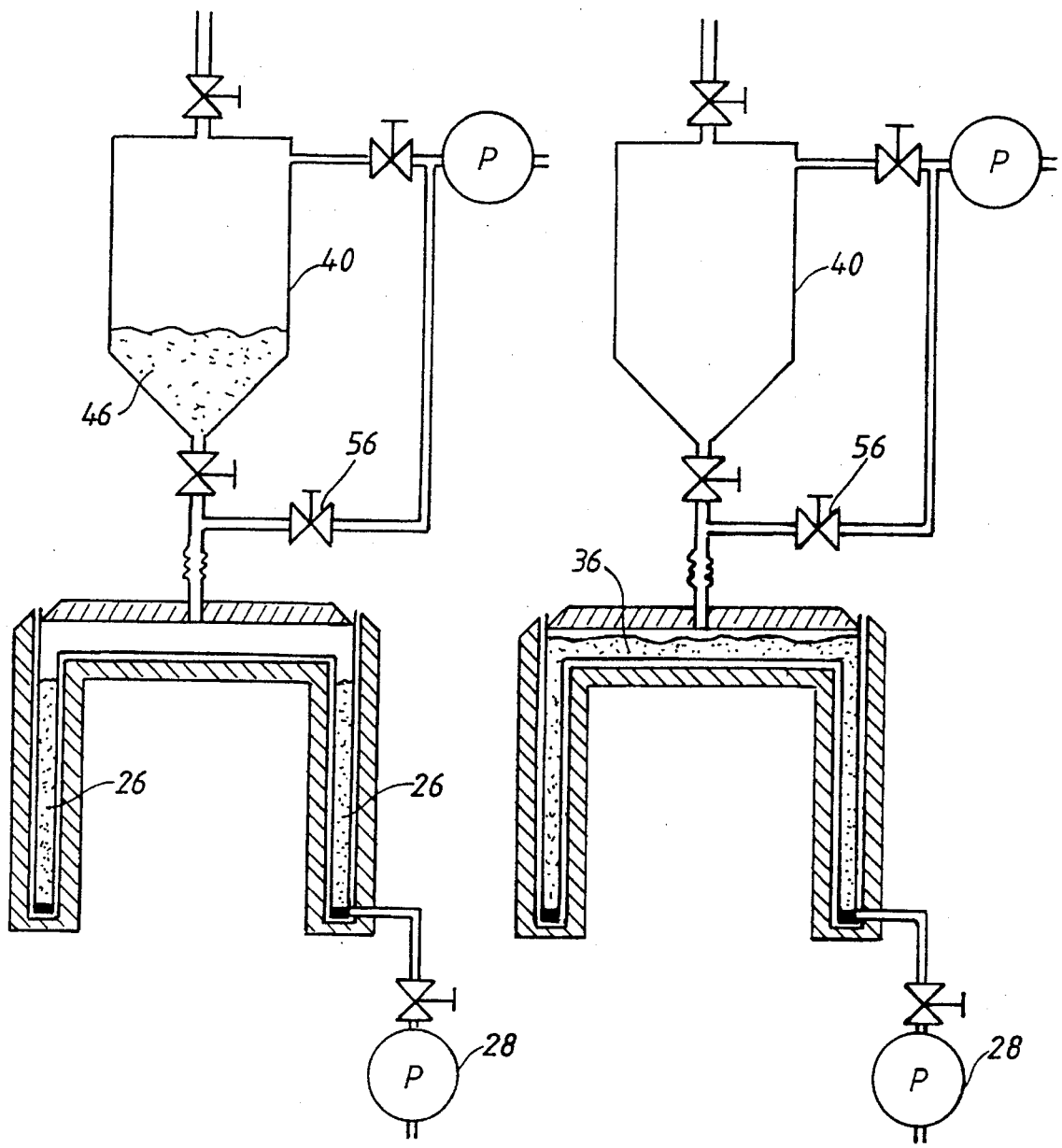
FIG. 2 shows the same sectional view as FIG. 1 in reduced scale, one part of the powder having been transferred to side walls of the body.
FIG. 3 shows when all the powder has been transferred to the body.
Figure 4:
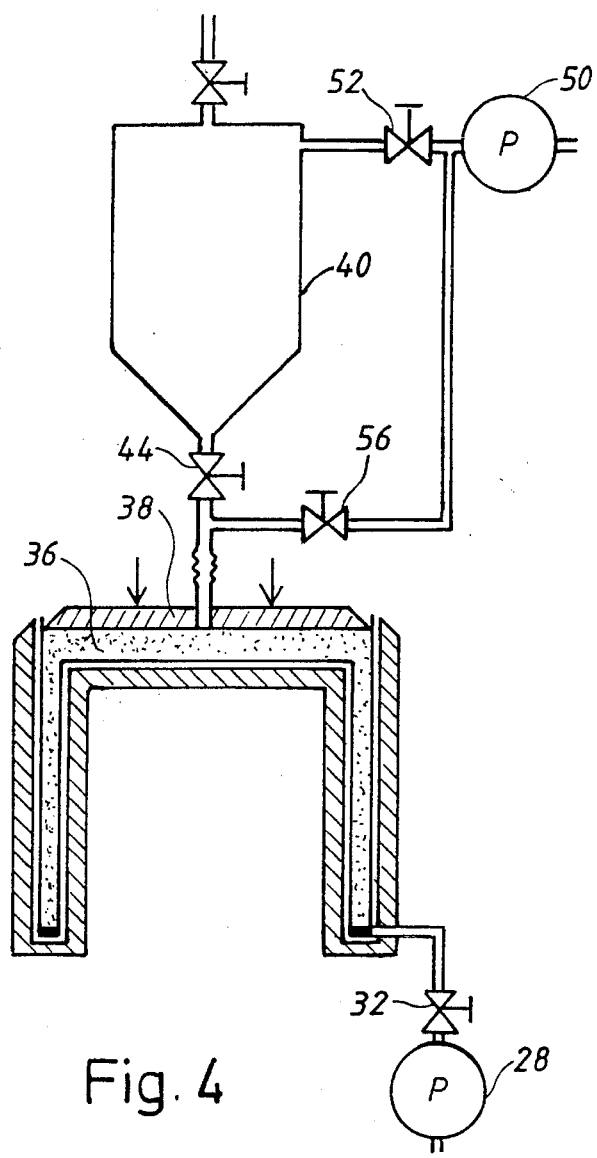
FIG. 4 shows the body, when the powder in a rear wall of the body is compressed.
Figure 5:
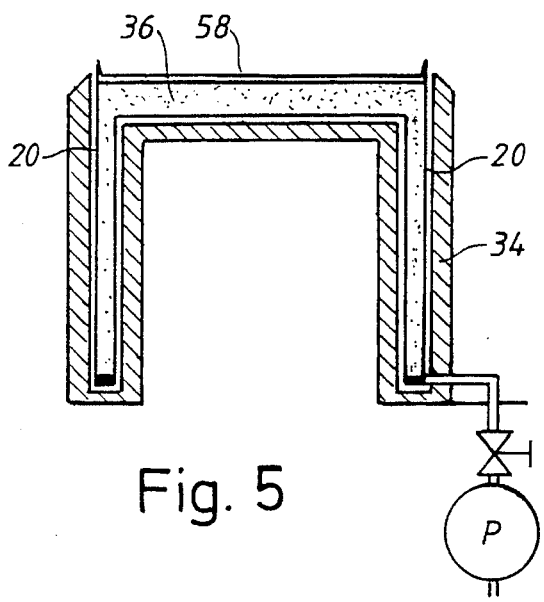
FIG. 5 shows the body, when the rear wall has been sealed with a plate.
Figure 6:
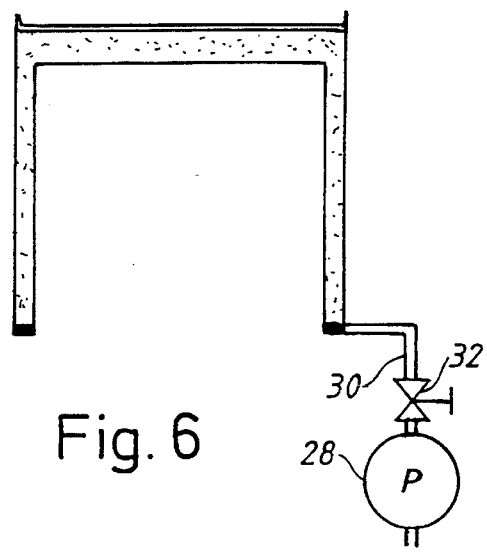
FIG. 6 shows the body removed from the fixture and ready for final evacuation.

The walls of the body can be filled and packed with powder in the following way: The total quantity of powder which is required for the insulation of the body is supplied through the valve 48 to the container 40. The pumps 28 and 50 are started. The valves 32 and 44 are opened. The valve 52 is opened so much, that one gets an overpressure above the pressure of ambient atmosphere of about 0.5 bar in the container 40. The air from the pump 50 flows towards the vacuum pump 28 and brings with it the powder, which is stopped by the filter element 24 and first fills the space 26 in the side walls (FIG. 2) and then the space 36 in the rear wall 12 (FIG. 3). The valve 56 is opened occasionally during the filling so that air of an overpressure above the pressure of ambient atmosphere of about 3 bar from the pump 50 packs the powder in the spaces 26 and 36. The powder in the space 36 can have difficulties to pack itself regularly by the flowing air. Therefore the powder in the space 36 can be further packed thereby that one presses the piston 38 (FIG. 4) against this powder. After that the valves 32, 44 and 52 are closed and the pumps 28 and 50 are stopped. The pump 28, which contributes to evacuate the gaseous medium from the walls through the filter element 24 and the pipe 30 can be spared during the filling and packing at the cost of said overpressure having to be increased correspondingly if the filling and packing shall not take longer time. The pump 28 must, however, be controlled so during the filling and packing, that it cannot cause any underpressure in the walls below the pressure of ambient atmosphere, which can cause an inward bend of the walls. The pump 28 is preferably controlled so that during the filling and packing a pressure of about the pressure of ambient atmosphere is obtained at the border between the powder and the filter element 24. The piston 38 is removed. A plate 58 is laid over the packed powder in the space 36 and is welded together with the plates 20 (FIG. 5). The body is evacuated to a certain degree by the vacuum pump 28, so that the powder between the plates 18 and 20 does not expand and bulges these plates and sinks down in the side walls 14, when the fixture is removed. The fixture 34 is removed (FIG. 6), after which the body is finally evacuated through the filter element 24 by the pump 28 or by some other vacuum source, the pipe 30 is sealed and the valve 32 and the vacuum pump 28 are removed. The body 10 is now ready to be used as insulation in a refrigerator or freezer.

Through the packing according to the above the volume of the powder will decrease to between about a half and a third, which gives an acceptable sinking in (less than 0.5 mm) of the walls at the final evacuation.

The container 40 does not have to be filled with the whole quantity of powder, which shall be supplied to the spaces 26 and 36, but can be filled with smaller quantities, which repeatedly are transferred to the spaces 26 and 36 thereby that air of an overpressure of about 0.5 bar above the pressure of ambient atmosphere is introduced into the container 40 from the pump 50.

When the container 40 has been emptied of such a smaller quantity, the pressure in the container 40 is increased to an overpressure of about 3 bar above the pressure of ambient atmosphere, which brings about that the powder in the spaces 26 and 36 is packed. With this procedure the conduit 54 and the valve 56 are not needed for packing the powder.

The plate 58 can also be welded together with the plates 20 before the filling begins, which filling then takes place through the pipe 42 in the piston 38 and a corresponding opening in the plate 58. With this procedure, the piston 38 is not used for further packing of the powder. Said opening in the plate 58 is sealed before the final evacuation takes place.

When the powder consists of kiselguhr or pearlite the fastest filling is obtained when the pressure in the container 40 is about 0.5 bar overpressure above the atmospheric pressure. At higher overpressures during the filling the powder runs the risk of being packed in and thereby clogging the valve 44. Good and uniform packing results have been obtained during the packing at overpressures above atmospheric pressure of the gaseous medium between 2 and 4 bar. The best result has been obtained at about 3 bar.

We claim:

1. Method for filling and packing insulating powder in hollow walls of a boxlike body (10) and then evacuating gaseous medium from the walls, so that the powder forms a vacuum insulation in the walls (14), the body (10) having a rear wall (12) and four side walls (14), said method comprising the steps of supporting the inner and outer sides of the walls in a fixture (34) with free edges (22) of the side walls pointing downwards, filling the walls by blowing the powder (46) into the rear wall (12) by gaseous medium of a first pressure, packing the powder by gaseous medium of a second pressure, which is higher than the first pressure, let into the rear wall, the media during the steps of filling and packing being let out of the walls via a filter element (24) arranged at the free edges (22), and evacuating the walls through the filter element (24) after the steps of filling and packing.

2. Method according to claim 1, wherein the powder is supplied from a container (40), and the gaseous medium of the first pressure acts on the powder (46) in the container and blows the powder into the rear wall (12).

3. Method according to claim 2, wherein the powder is packed by gaseous medium of the second pressure let past the container (40) into the rear wall (12), when there is still powder in the container.

4. Method according to claim 2, wherein the powder is packed by gaseous medium of the second pressure let into the rear wall (12) through the container (40) after the container's powder contents have been emptied.

5. Method according to any of the preceding claims, wherein the media is let out of the walls to a vacuum pump (28) during the steps of filling and packing.

6. Method according to claim 1, further comprising the step of applying a force transverse to the rear wall (12) to further pack the powder.

* * * * *